(12) United States Patent
Su et al.

(10) Patent No.: US 12,293,398 B2
(45) Date of Patent: May 6, 2025

(54) COMPUTERIZED SYSTEM AND METHOD FOR APPLYING TRANSFER LEARNING FOR GENERATING A MULTI-VARIABLE BASED UNIFIED RECOMMENDATION

(71) Applicant: YAHOO ASSETS LLC, Dulles, VA (US)

(72) Inventors: Wei-Lun Su, Jiaoxi Township (TW); Pei-Ling Chen, Taipei (TW); Chia-Chuan Ho, Taipei (TW); Tzu-Chiang Liou, New Taipei (TW)

(73) Assignee: YAHOO ASSETS LLC, New York, NY (US)

(*) Notice: Subject to any disclaimer, the term of this patent is extended or adjusted under 35 U.S.C. 154(b) by 931 days.

(21) Appl. No.: 16/826,545

(22) Filed: Mar. 23, 2020

(65) Prior Publication Data
US 2021/0295410 A1   Sep. 23, 2021

(51) Int. Cl.
*G06Q 30/0601* (2023.01)
*G06F 16/33* (2019.01)
(Continued)

(52) U.S. Cl.
CPC ..... *G06Q 30/0631* (2013.01); *G06F 16/3344* (2019.01); *G06F 16/383* (2019.01);
(Continued)

(58) Field of Classification Search
CPC .... G06Q 30/06; G06Q 30/0631; G06F 16/24; G06F 40/58; G06F 40/205; G06F 40/30;
(Continued)

(56) References Cited

U.S. PATENT DOCUMENTS 9,684,653 B1 *   6/2017   Bhagat ............... G06F 16/36
9,996,626 B1 *   6/2018   Bailey ............... G06F 16/9535
(Continued)

OTHER PUBLICATIONS

Ahuja et al, Language-Agnostic Representation Learning for Product Search on E-Commerce Platforms, WSDM '20, Feb. 3-7, 2020, Houston, TX, USA, pp. 7-15 (Year: 2020).*
(Continued)

*Primary Examiner* — Marc S Somers
(74) *Attorney, Agent, or Firm* — James J. DeCarlo; Greenberg Traurig, LLP

(57) ABSTRACT

Disclosed are systems and methods for improving interactions with and between computers in content providing, searching and/or hosting systems supported by or configured with devices, servers and/or platforms. The disclosed systems and methods provide a novel recommendation framework that automatically applies transfer learning from a knowledge-base and generating a multi-variable based unified recommendation. The framework dynamically develops a universal word dictionary between a source language and a target language based on Natural Language Processing (NLP word embeddings. This not only leverages the accuracy of multi-lingual product embeddings, but also increases the efficiency and effectiveness in how it can be applied. The disclosed systems and methods, therefore, provides a novel computerized solution for how different knowledges learnt from one electronic platform can be adapted to a global platform for providing global users electronic information.

20 Claims, 6 Drawing Sheets

(51) Int. Cl.
  *G06F 16/334* (2025.01)
  *G06F 16/383* (2019.01)
  *G06F 40/205* (2020.01)
  *G06F 40/30* (2020.01)
  *G06F 40/58* (2020.01)
(52) U.S. Cl.
  CPC ............ *G06F 40/205* (2020.01); *G06F 40/30* (2020.01); *G06F 40/58* (2020.01)
(58) Field of Classification Search
  CPC . G06F 16/3344; G06F 16/383; G06F 16/3337
  See application file for complete search history.

(56) References Cited

U.S. PATENT DOCUMENTS

| | | | | |
|---|---|---|---|---|
| 2009/0193003 | A1* | 7/2009 | Heymans | G06F 16/3337 |
| 2013/0318101 | A1* | 11/2013 | Chen | G06F 16/3326 |
| | | | | 707/748 |
| 2014/0068451 | A1* | 3/2014 | Ngo | H04W 4/029 |
| | | | | 715/738 |
| 2014/0278410 | A1* | 9/2014 | Basson | G10L 15/26 |
| | | | | 704/235 |
| 2014/0280295 | A1* | 9/2014 | Kurochkin | G06F 16/3337 |
| | | | | 707/769 |
| 2015/0046281 | A1* | 2/2015 | Shivaswamy | G06Q 30/0631 |
| | | | | 705/26.7 |
| 2015/0278931 | A1* | 10/2015 | Wantz, II | G06Q 30/0641 |
| | | | | 705/26.8 |
| 2016/0140643 | A1* | 5/2016 | Nice | G06F 16/3344 |
| | | | | 705/26.7 |
| 2016/0350288 | A1* | 12/2016 | Wick | G06F 40/44 |
| 2017/0270101 | A1* | 9/2017 | Kopru | H04L 67/01 |
| 2018/0307679 | A1* | 10/2018 | Duong | G06N 3/082 |
| 2019/0102698 | A1* | 4/2019 | Roberts | G06F 16/221 |

OTHER PUBLICATIONS

Ai et al, Explainable Product Search with a Dynamic Relation Embedding Model, ACM Transactions on Information Systems, vol. 38, No. 1, Article 4, Oct. 2019; 29 pp. (Year: 2019).*

Stein et al, Towards language-agnostic alignment of product titles and descriptions: a neural approach, WWW '19 Companion, May 13-17, 2019, San Francisco, CA, USA, pp. 387-392 (Year: 2019).*

* cited by examiner

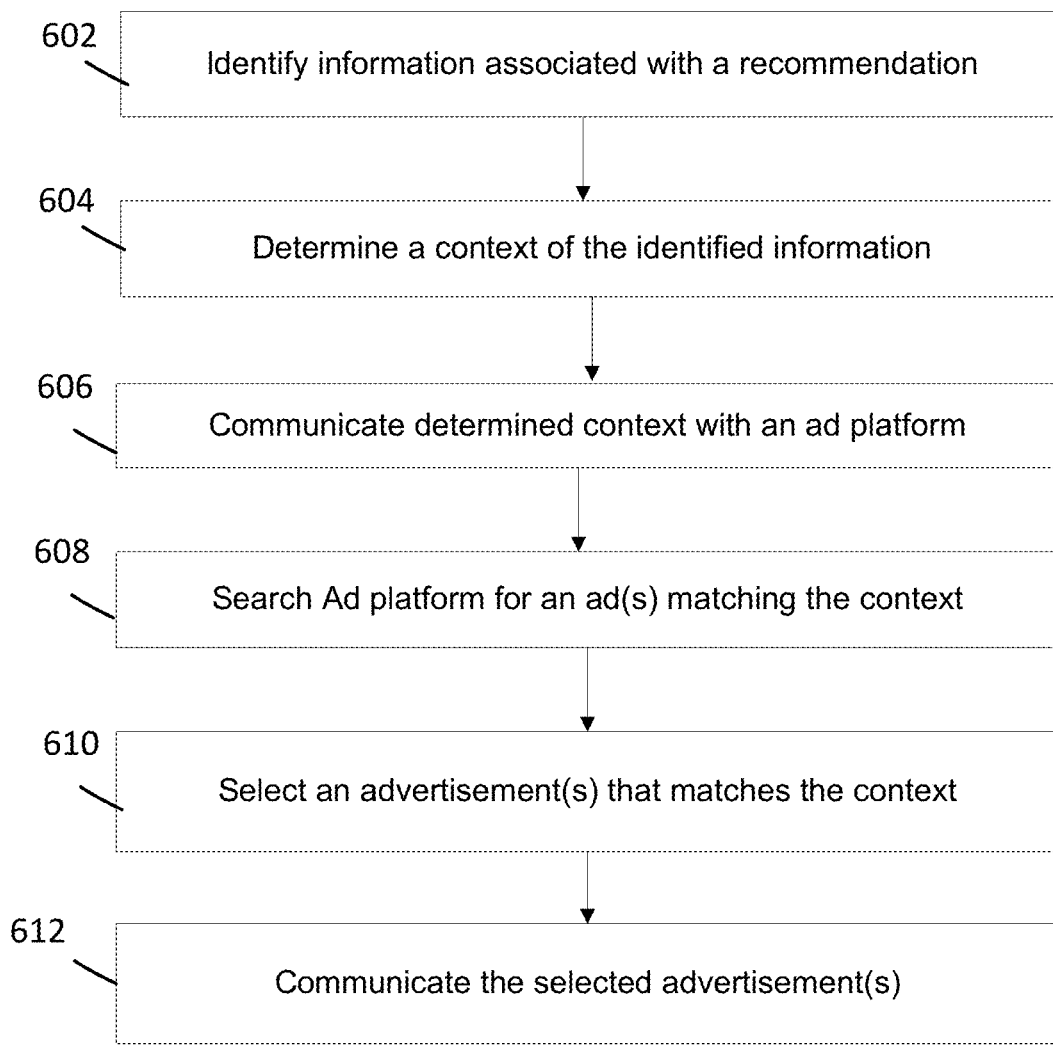

COMPUTERIZED SYSTEM AND METHOD FOR APPLYING TRANSFER LEARNING FOR GENERATING A MULTI-VARIABLE BASED UNIFIED RECOMMENDATION

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of network based computerized content hosting and providing devices, systems and/or platforms by modifying the capabilities and providing non-native functionality to such devices, systems and/or platforms through a novel and improved recommendation framework for automatically applying transfer learning from a knowledge-base and generating a multi-variable based unified recommendation.

BACKGROUND

Existing computerized recommendation systems are capable of providing users with electronic recommendations; however, these systems are essentially "land-locked", in that they are unable to coordinate with other systems that are from different regions, cultures or from locations that base their systems on a differing set of variables.

For example, a recommendation system built from a knowledge-base of US users may have different variables it considers important in recommending content to users than a recommendation system in Europe. Currently there is no way to cross-pollinate these systems so that the data in Europe is viable to the users under the US system. Therefore, the European data is effectively useless in understanding a US user's actions for purposes of providing content recommendations.

Currently, global eCommerce is in a state referred to as "cold start" where there is not enough data to build a confident unified recommendation system. There is no system that can account for a global set of data, make sense of it, and apply it in a universal manner so that users from differing regions can receive accurate and effective recommendations. The current piecemeal approach of providing network based electronic recommendations "per region" is not working, not accurate, and does not fit to the current "global scale" that users are current operating.

SUMMARY

This disclosure identifies a need for a scalable system that can be universally applied on a global scale by incorporating the recommendation data from disparate recommendation resources across the world. The disclosed systems and methods address these shortcomings and provide a novel lingual-independent knowledge transfer framework as an end-to-end solution. Multi-lingual product representation is utilized to diminish the barrier caused by, for example, language differences between markets.

The disclosed systems and methods build upon affiliate marketing infrastructures—e.g., where a publisher delivers a product provided by another company or an individual in the form of hyperlink. This cross-marketing infrastructure is built upon two types of scenarios: (1) article/mail-to-product recommendation, which involves recommendation modules on media article pages and recommendation modules on mail pages; and (2) product-to-product recommendation, which involves recommendation modules on global eCommerce product pages.

The disclosed framework provides a unified network configuration that harmonizes disparately located and uniquely designed marketing infrastructures, and can enable stored user data and user traffic data from platforms such as Mail, Sports, Finance, Frontpage, and the like, to be guided into (the same or other) provider's business. This can result in increased user traffic, network usage, click-throughs, ad-sales and the like, as discussed below.

According to embodiments of the instant disclosure, the disclosed systems and methods provide a novel framework that utilizes word embeddings determined from natural language processing (NLP) techniques to get concept-level representations of words. Unlike keyword matching which is difficult at best to apply to multi-lingual processing environments, the disclosed word embedding processing is capable of determining similar concepts between two words that are literally different from each other (e.g., words corresponding to the same product, item, service, data, and/or context, that are in different languages).

As discussed below, the disclosed systems and methods dynamically develop a universal (or unified) word dictionary between a source language and a target(s) language. This not only leverages the accuracy of multi-lingual product embeddings, but also increases the efficiency and effectiveness in how it can be applied. The disclosed systems and methods, therefore, provide a novel computerized solution for how different knowledges learnt from one eCommerce market (or platform) can be adapted to other markets on a global eCommerce scale.

For example, Taiwan (TW) eCommerce is a huge market in the Asian-Pacific (APAC) that has been developed and has matured for much of this century. A personalized recommendation system has been built up and been proven to effectively double revenue. With over 45 million items and 8 million of active users a day, data processed from the TW market has become one of the most valuable assets for providing electronic recommendations (via, e.g., Yahoo!®, Verizon®) in TW.

This system is built on a growing database of users and their preferences, as well as a network of products and hundreds of thousands of users' behaviors, including, but not limited to, co-view, co-buy, and the like.

The TW eCommerce system, due to its maturity in its development and effectiveness in APAC, provides a proper example for how the disclosed systems and methods can take one eCommerce platform and apply it to different regions around the globe. The discussion herein will utilize the benefit of the TW eCommerce system as its base (or source) system; however, it should not be construed as limiting, as any type of exiting knowledge-base, whether from a single region or multiple countries can be utilized without departing from the scope of the instant disclosure.

The TW online marketing platform includes three properties: Shopping (B2B2C), Store (B2C), and Auction (C2C). With 45 million online products and 8 million unique users in each property, profiles like user preference and co-viewed item lists built in this sector can have a huge amount of valuable information. This existing data, from for example, the TW eCommerce platform/market, can be exploited to benefit a new eCommerce business, i.e., global eCommerce. Under the current climate and via conventional systems, there is not enough viable data to build a confident unified recommendation system. Since languages are divergent between regions, the disclosed systems and methods equal out the differences so that existing knowledge-base data can be universally understood and applied via a developed unified/global eCommerce platform.

In accordance with one or more embodiments, the instant disclosure provides computerized methods for a novel framework for automatically applying transfer learning from a knowledge-base and generating a multi-variable based unified recommendation. In accordance with one or more embodiments, the instant disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, email server, ad server, content server and/or client device, and the like) cause at least one processor to perform a method for a novel and improved framework for automatically applying transfer learning from a knowledge-base and generating a multi-variable based unified recommendation.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 6 is a block diagram illustrating an exemplary data flow in accordance with some embodiments of the present disclosure.

DESCRIPTION OF EMBODIMENTS

Figure 1:
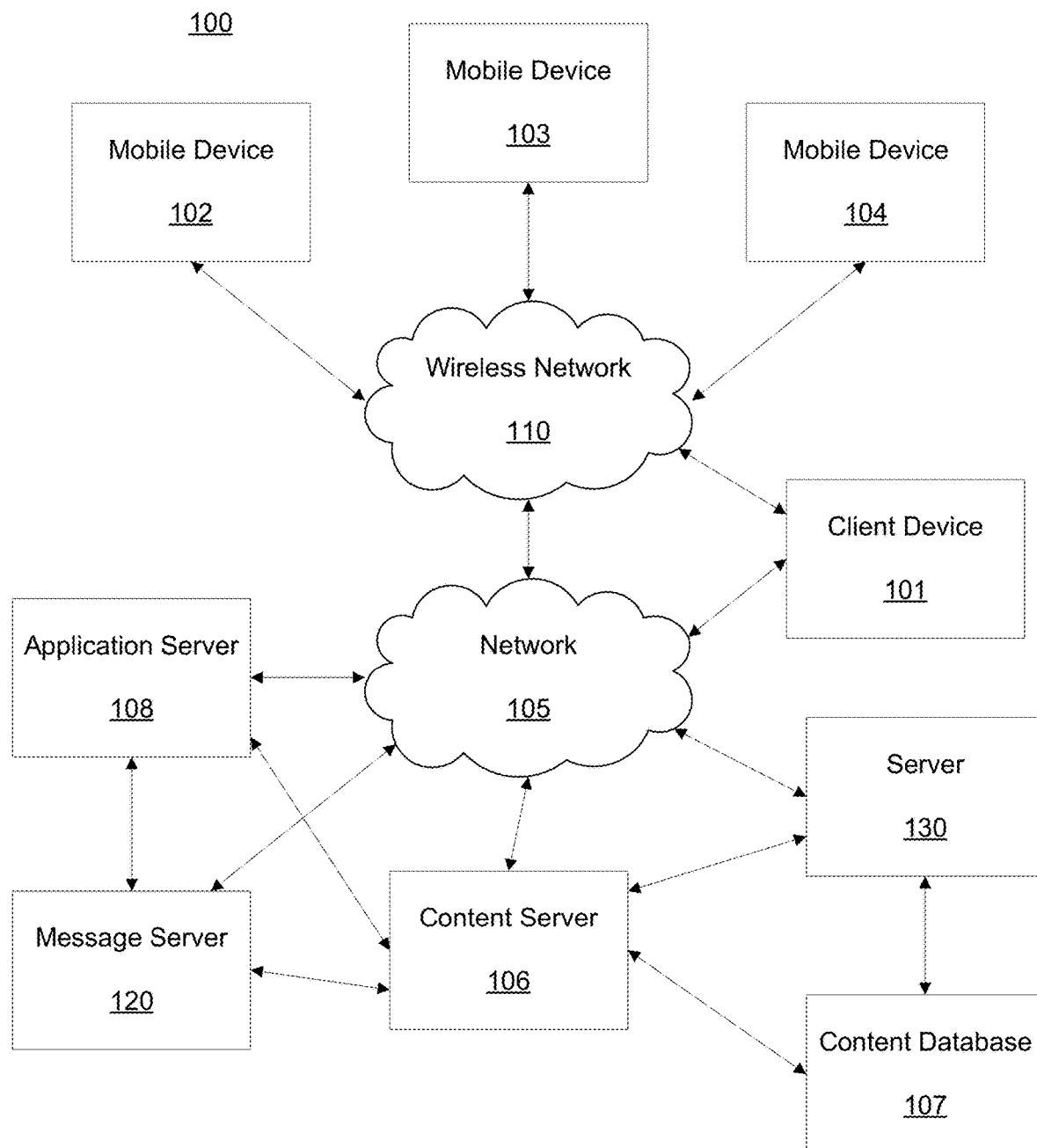
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$, or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

As discussed in more detail below at least in relation to FIG. 6, according to some embodiments, information associated with, derived from, or otherwise identified from, during or as a result of the recommendation, as discussed herein, can be used for monetization purposes and targeted advertising when providing, delivering or enabling such devices access to content or services over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, message server 120 and third party server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

Third party server 130 can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo!@, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as a mail application (e.g., Yahoo! Mail®, Gmail®, and the like), instant messaging application, blog, photo or social networking application (e.g., Facebook®, Twitter® and the like), search application (e.g., Yahoo!® Search), and the like, can be hosted by the application server 108, message server 120, or content server 106 and the like.

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108 and/or 130 may be integrated into a single computing device, without departing from the scope of the present disclosure.

Figure 2:
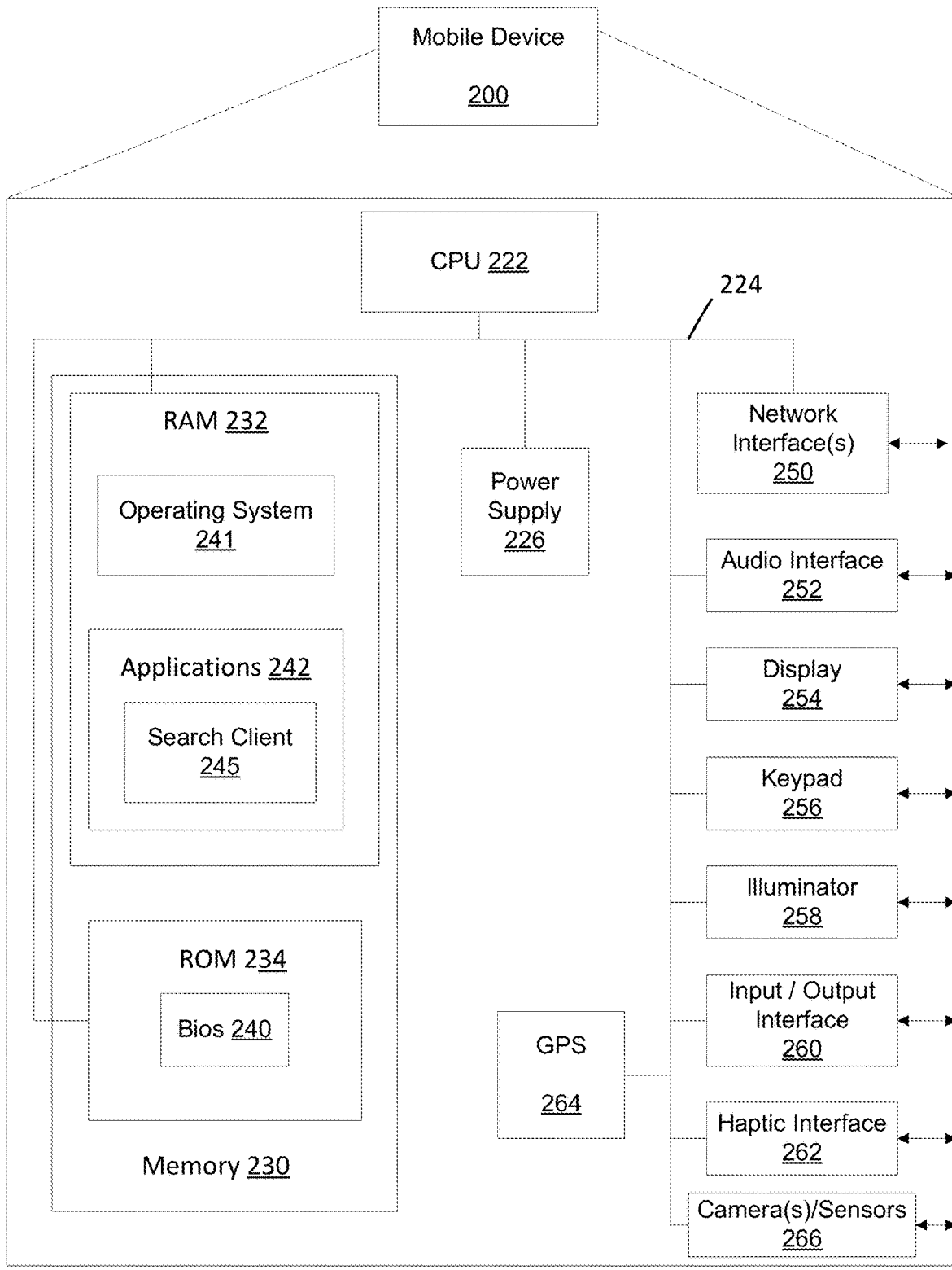
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below.

Figure 3:
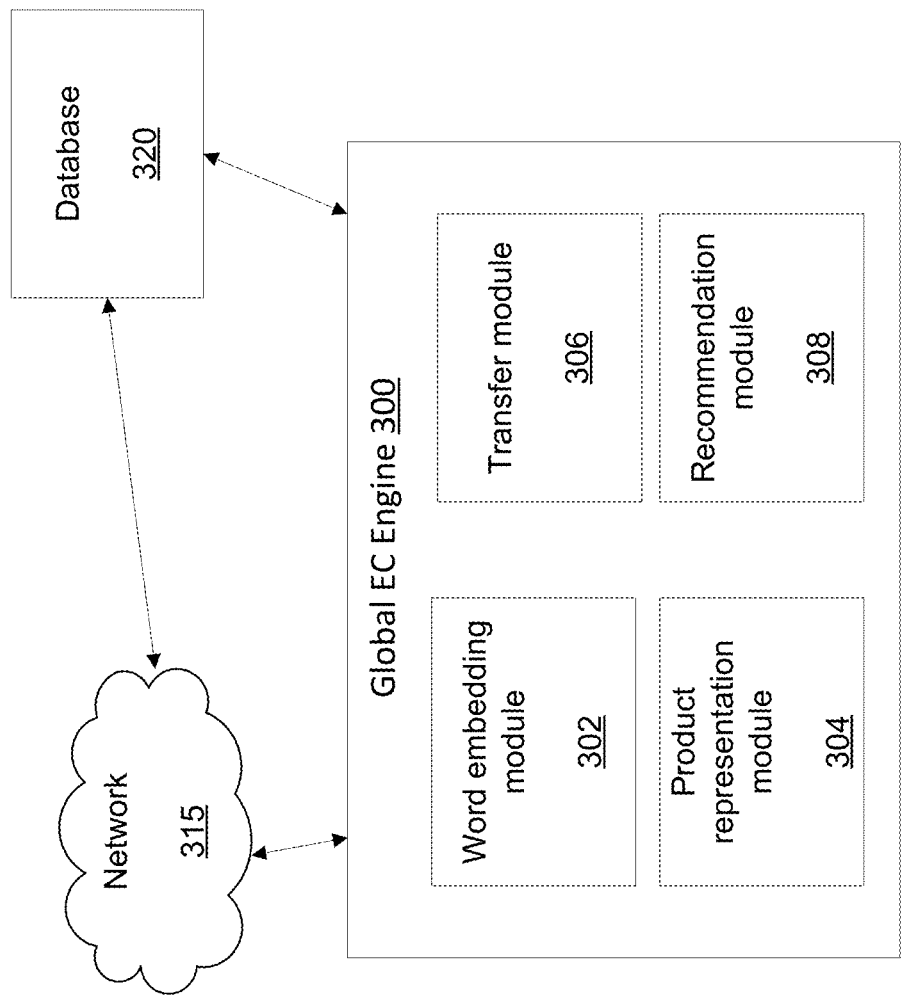
FIG. 3 is a block diagram illustrating components of an exemplary system in accordance with embodiments of the present disclosure.

FIG. 3 is a block diagram illustrating the components for performing the systems and methods discussed herein. FIG. 3 includes global eCommerce (EC) engine 300, network 315 and database 320. The EC engine 300 can be a special purpose machine or processor and could be hosted by a cloud server (e.g., cloud web services server(s)), messaging server, application server, content server, social networking server, web server, search server, content provider, third party server, user's computing device, and the like, or any combination thereof.

According to some embodiments, EC engine 300 can be embodied as a stand-alone application that executes on a user device. In some embodiments, the EC engine 300 can function as an application installed on the user's device, and in some embodiments, such application can be a web-based application accessed by the user device over a network. In some embodiments, the EC engine 300 can be installed as an augmenting script, program or application (e.g., a plug-in or extension) to another application (e.g., Yahoo! Mail® or Amazon Web Services (AWS)).

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with a user, a product, an item and a service from an assortment of media and/or service providers and/or platforms. For example, the information can be related to, but not limited to, type of a message (human generated or machine generated), an item (for a product or service), a user, a content type, class or category, and any other type of known or to be known attribute or feature associated with an item, user and/or message, or some combination thereof.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the EC engine 300, and the database of stored resources 320. Indeed, as illustrated in FIG. 3, the EC engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as EC engine 300, and includes word embedding module 302, product representation module 304, transfer module 306 and recommendation module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
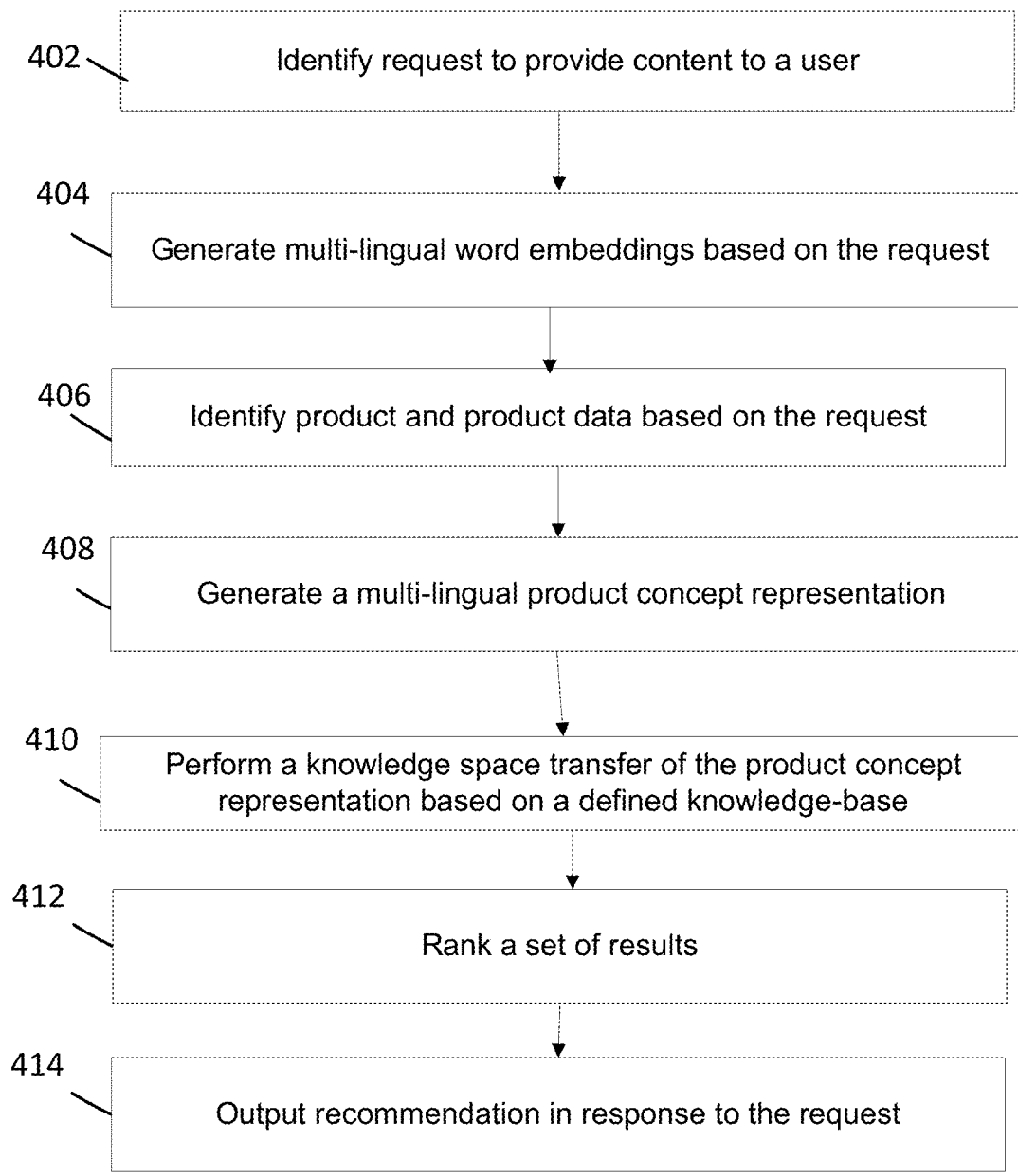
FIG. 4 is a block diagram illustrating an exemplary data flow in accordance with some embodiments of the present disclosure.

Turning to FIG. 4, Process 400 provides a non-limiting data flow detailing how a unified, multi-lingual recommendation is generated and provided to users.

According to some embodiments of Process 400 of FIG. 4, Steps 402 and 412-414 of Process 400 are performed by the recommendation module 308 of EC engine 300; Step 404 is performed by the word embedding module 302; Steps 406-408 are performed by the product representation module 304; and Step 410 is performed by the transfer module 306.

Process 400 details embodiments for automatically applying transfer learning from at least one knowledge-base for generating a multi-variable based universal recommendation. The framework dynamically develops a universal word dictionary between a source language and a target language based on NLP word embeddings. This leverages the accuracy of multi-lingual product embeddings, and also increases the efficiency and effectiveness in how it can be applied.

The computational challenge for eCommerce knowledge transfers is how to align the semantic meanings of products among disparate languages. There are currently a number of existing techniques; however, as outlined below, they are computationally deficient in their accuracy, efficiency and overall effectiveness in adapting to the multi-lingual, global scale.

One current system involves a supervised solution that assumes the target language embedding can be represented as a linear transformation on source language embeddings:

$$W^* \arg\min \|WX-Y\| \quad \text{(Eq. 1).}$$

Where W is the mapping function for source embedding X to target embedding Y.

In another system, an orthogonality constraint can be applied to W; however, this results in a Procrustes problem, which has a disclosed form:

$$W^* = \arg\min \|WX-Y\|_* = UV^T,$$

$$\text{Where } UV^T = SVD(YX^T) \quad \text{(Eq. 2).}$$

However, the supervised learning of these above methods requires an already built (or existing) word dictionary between the source and the target languages. Additionally, they do not factor in attributes of products, services or items that are to be recommended, and do not account for the manner these items are described in the different markets. Thus, they fall short in providing a dynamically determined, updated and applied knowledge-base that is adaptively configured for where recommendations are to be provided (e.g., the target), as well as where the origin/source data originated from (e.g., the source).

The disclosed systems and methods, through execution of engine 300, provide a novel framework that executes processing steps referred to as "AdvRefine," which is an unsupervised technique that reduces the reliance on editorial resources required to construct the dictionary, as discussed herein, as well as provides mechanisms for assimilating the disparate, multi-lingual data from independent sources/targets.

In AdvRefine, there are two steps to establish the cross-lingual embeddings. First, it leverages the power of adversarial training to learn a linear mapping $W_{adv}$ from a source language to another without any predefined word dictionary. The training process includes a discriminator continuously maximizing its ability to identify the origin of an embedding and a generator focusing on producing the mapping matrix $W_{adv}$ to deceive the discriminator.

With the learnt mapping matrix $W_{adv}$, a set of anchor words of the highest confidence scores, i.e., a word dictionary, can be generated. The Procrustes problem in the supervised learning is untied on these anchor words to learn a refined, more accurate mapping matrix W* (Eq. 2) between the source language and the target.

Therefore, as discussed below, the recommendation process disclosed in Process 400 involves a multi-lingual word embedding technique that improves how a dictionary is generated, updated and applied to a target situation, which improves its accuracy in how it can be effectively applied.

Turning to embodiments of FIG. 4, Process 400 begins with Step 402 where a request to provide a recommendation is identified. The request can be a specific user input that indicates the user is searching for a specific item, a set of items, or is requesting a recommendation from a system. The input can be a user entered query, search entry or the navigation to a specific webpage, opening message, opening a web application or selecting a hyperlink, and the like.

The request can also be an implicit user action, such as, for example, the user being at a specific location, at a time, interacting with a particular network resource or other user(s), and the like.

The request can also be provided by or associated with a third party provider or a service provider that is providing the recommendation (e.g., Verizon®). The request can indicate that the provider intends to send the user a content or item recommendation. This form of a request can be based on a user action is outlined above.

The request identified in Step 402 can include data and/or metadata that indicates or provides the basis for providing an item(s) to a user. The data/metadata can indicate social, logical, temporal or spatial data of the user, a service or item (e.g., a product or event). The data/metadata can also indicate the attributes, features, or other characteristics of a product, service or event.

Thus, Step 402 results in the identification of a user, a product/item or service information, and/or the identification of what to send to a user (e.g., send a user a message related to an item, service or event). Step 402 can also result in the identification of the language the request is generated from/ associated with, which can be based on the request, demographics of the user, and the like.

For purposes of this discussion, the origin (or source) language will be Taiwanese; however, it should be construed as limiting, as any type of language, whether known or to be known, human based or computer-generated, can be utilized without departing from the scope of the disclosure, as evident from the below discussion.

In Step 404, multi-lingual word embeddings are generated based on the request. Such generation involves determining what the source language is and what the target language(s) are. This can involve parsing the request and identifying information in the request that indicates this information. As discussed above, the source language is Taiwanese. The target language can be determined based on criteria that indicates what language or languages the word embeddings are to be generated in a form of. That is, how many and different types of languages are to be used when translating the source language word embeddings into different embeddings.

Figure 5:
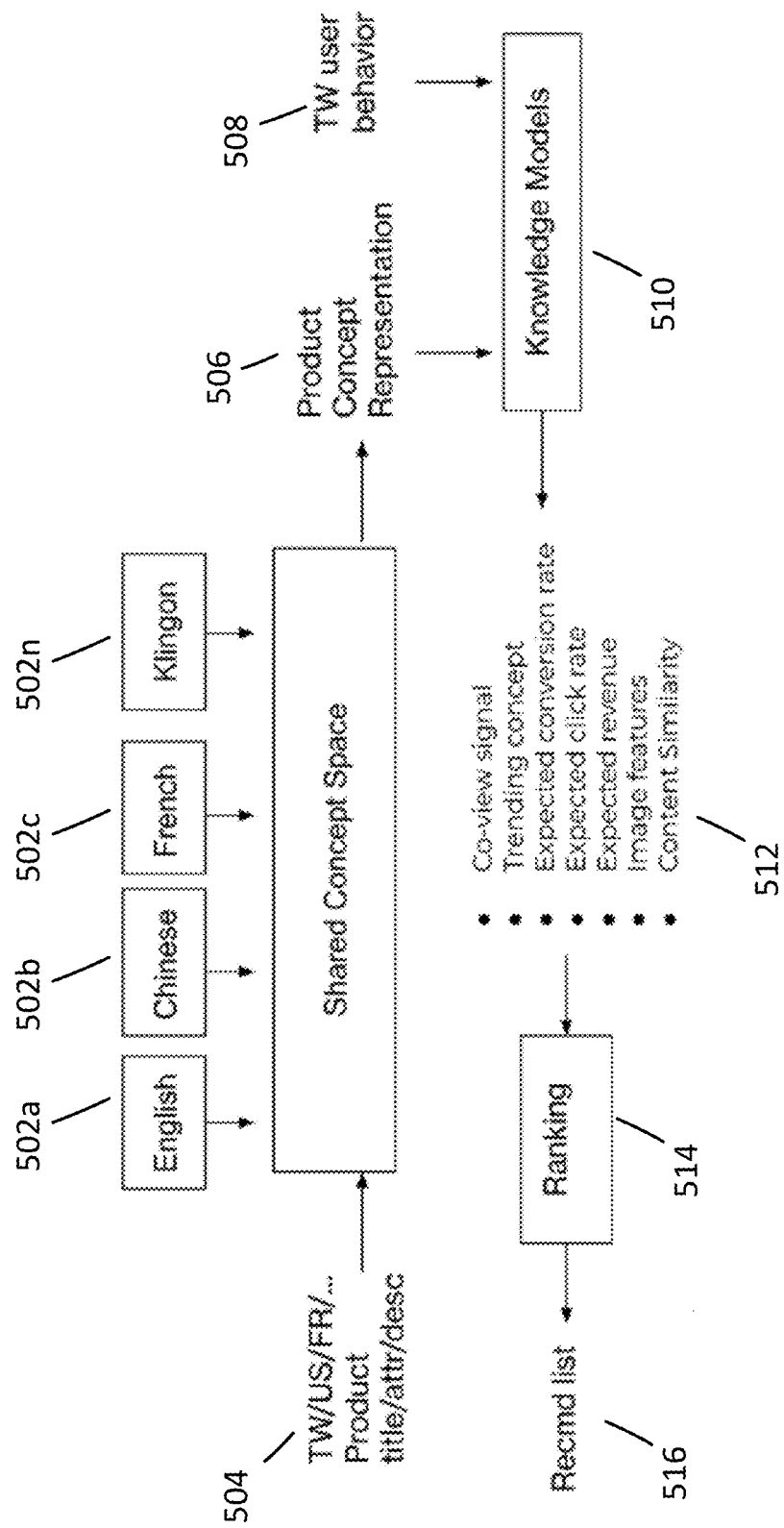
FIG. 5 is a schematic diagram illustrating a non-limiting example of components for generating and providing a unified recommendation in accordance with some embodiments of the present disclosure.

An example of this is depicted in operating environment 500 in FIG. 5, which depicts word embeddings for the request being generated in a plurality of languages (502a-502n)—for example, English (502a), Chinese (502b), French (502c) . . . and Klingon (502n), which is used to emphasize that any quantity and type of known or to be known language can be the basis for word embeddings). The target language can be one or more (e.g., 1-n) languages, as discussed herein.

Step 404 involves parsing the request and determining a total m words in both the source language and the target language. Let $X=\{x_1, \ldots, x_m\}$ be a set of word embeddings corresponding to the source language and $Y=\{y_1, \ldots, y_m\}$ be another set of word embeddings corresponding to a target language. The embeddings of X and Y are not located in the same space (for example, Taiwanese and English). Engine 300, as discussed herein, can implement the AdvRefine algorithm (discussed above) to determine a $W_{adv}$ where, $W_{adv} X \sim Y$. With $W_{adv}$, AdvRefine is able to provide a word dictionary:

$$\text{Dictionary} = \{x_i \cdot y_y | x_i \in X_{adv} \subset X, y_i \in Y_{adv} \subset Y\} \quad \text{(Eq. 3)},$$

in which the distances between pairs ($W_{adv}$ $x_i$, $y_i$) is considered to satisfy a threshold indicating an accurate output. With the generated word dictionary, the final mapping function W* can be determined to convert the source embedding into the space of the target embeddings.

The refinement here involves the exploitation of the mapping function $W_{adv}$ to set up a list of candidates $y_j^i$ given an $x_i$. With a produced candidate set for each $x_i$, the best $y_j^{i*}$ can be selected, either automatically and/or (in some embodiments) by an editor, based on a consideration of its semantic value.

Since the resource of editor support is not unlimited, $x_i \in \mathbb{R}$ is assumed, then, the minimal effective size of the selected dictionary in refinement is p. QR decomposition is further applied on $X_{adv}$ to determine the critical embeddings, $X_{adv}^{QR} \subset X_{adv}$, that can be checked (for example, by editors). The selected word dictionary can be denoted as follows:

$$\text{DictionaryQR} = \left\{ x_i \to y_i, \begin{array}{l} x_i \in X_{adv}^{QR} \subset X_{adv} \\ y_i \in Y_{adv}^{QR} \subset Y_{adv} \end{array} \right\}. \quad \text{(Eq. 4)}$$

Thus, based on the above, a reliable mapping matrix W* can be calculated using Eq. 2 based on the selected word dictionary, DictionaryQR.

With the learnt W*, word embeddings of the source language can be mapped to the same space as where word embeddings of the target language are located. The space is then considered shared, and the embeddings inside this space are defined as shared word embeddings, or multilingual word embeddings. (Step 404).

An example of this is provided by the following algorithm (Algorithm 1):

| Algorithm 1: QR-AdvRefine |
|---|
| Data: X and Y are two sets representing two word embeddings in disparate languages and different spaces.<br>Result: W* is a mapping matrix such that W*X~Y.<br>1   Learn $W_{adv}$ by the adversarial training process proposed in AdyRefine.;<br>2   Based on $W_{adv}$, select $X_{adv}$ that are considered have a |

-continued

Algorithm 1: QR-AdvRefine

|   | |
|---|---|
| | corresponding $Y_{adv}$ with the highest confident scores.; |
| 3 | Assume the source embeddings have the dimension P, select P critical word embeddings (anchor words, or word dictionary), namely $X_{adv}^{QR}$, from $X_{adv}$ by QR decomposition.; |
| 4 | [Optional] Given $X_{adv}^{QR}$, Ask for editor support to identify best $Y_{adv}^{QR}$ given a candidate set calculated based on $W_{adv}$; |
| 5 | Apply Procrustes solution on $X_{adv}^{QR}$ and $Y_{adv}^{QR}$ to get the refined W*; |
| 6 | Return W* as the mapping function; |

Continuing with Process 400, after the multi-lingual word embeddings are produced (Step 404), the product representation(s) can be composed based therefrom. Step 406.

As depicted in FIG. 5, a product description for a product or products 504 can be provided, which includes information about the product(s) in a number of languages. The products can be based on a search for product data in line with the request (from Step 402). The product description can be in a type and number of languages that corresponds to the source and target languages. The product information can include, but is not limited to, the name/title of the product (or service), price, stock value, description, attributes (e.g., dimensions), provider, offer from which it is based, and the like.

Considering a product m, a proper word segmentation technique (e.g., NLP) is applied, its title can be broken down into several unique words. A computer vision (e.g., bag-of-words) algorithm or technique is then utilized on the segmentation in order to eliminate the grammar differences between languages. For example, the set of these words can be $w_m = \{w_1^m, w_2^m, \ldots, w_a^m\}$.

As a result, in Step 408 (and illustrated in FIG. 5 as item 506) the product semantic representation can be formed as:

$$e_s^m = \sum_{i=1}^{a} c(w_i^m), \quad \text{(Eq. 5)}$$

where $e_s^m$ is the semantic representation for a product m, and $c(w_i^m)$ denotes the corresponding word embeddings in the multi-lingual space produced in Step 404 for a word $w_i^m$.

Once products with descriptions (e.g., titles) among different languages are represented in a unified multi-lingual space (e.g., multi-lingual product representations from Step 408, as depicted in 506), knowledge learnt from disparate markets with divergent languages can be transferred. Step 410 (as depicted in item 510 in FIG. 5) can involve two models: 1) direct embedding space transfer, which involves co-view knowledge and image similarity analysis; and 2) extended feature space transfer, which involves prediction of conversion rate (CVN), prediction of click-through-rate (CTR) and prediction of revenue. As discussed below, these models can provide the features depicted in FIG. 5—item 512, which provide a non-limiting example of feature data output by the models via the transfer module 306 of engine 300.

Turning first to an embodiment where Step 410 performs 1) direct embedding space transfer, information from the source language market is identified. In some embodiments, this information comprises co-view and co-buy data (or signals) from user behaviors from the TW knowledge-base, which can be exploited to modify, update and/or train product representations. This is depicted in item 508 from FIG. 5.

The utilization of TW behavior data (e.g., co-view; co-buys data) can be performed in a similar manner discussed above in relation to Step 404. In some embodiments, let $E_c = \{e_c^1, e_c^2, \ldots, e_c^n\}$ be a set of co-view similarity based product representations. Each $e_c^i$ of a product I has a corresponding semantic similarity $e_s^i$, which is linked by their lexical semantics in titles or other metadata (from item 504). Therefore, the 1) direct embedding space (knowledge) transfer can be formulated as follows:

$$W_c^* = \arg\min W_c E_s - E_c \quad \text{(Eq. 6)}$$

where $E_s$ is the set of semantic product representations derived from Steps 406-408.

According to some embodiments, the proscrutes solution may not be applied as the orthogonality cannot be assumed because $E_c$ and $E_{sg}$ are dissimilarly constructed.

The model for 1) direct embedding space (knowledge) transfer can be realized through the below algorithm (Algorithm 2):

Algorithm 2: Direct Transfer

| | |
|---|---|
| Data: | $E_c$: co-view similarity-based product repr. |
| | $E_s$: semantic product repr. in the shared multi-lingual space. |
| | $E_c$ and $E_s$ has one-to-one mapping simply known from their lexical meanings in titles. |
| | $E_g$: semantic product repr. that is not in the shared multi-lingual space. |
| | W*: a mapping matrix such that $WE_g \sim E_{sg}$ where $E_{sg}$ is a semantic product repr, in the same space with $E_s$. |
| | $W_c^*$: a mapping matrix such that $W_c E_s \sim E_c$. |
| Result: | $Ex_s^i$: semantic product repr. of $e_g^i \in E_g$, that are considered to have co-views learnt from the space of $E_c$. |
| 1 | Produce $E_{sg}$ by $E_{sg} = W^* E_g$; |
| 2 | Compute $W_c^* = \arg\min W_c E_{sg} - E_c$, (Note $W_c$ is not orthogonal but is inverible): |
| 3 | Get $E_{cg} = W_c^* E_{sg}$ where $E_{cg}$ and $E_c$ are in the same space; |
| 4 | Find k nearest neighbors $E_c^i = [e_{c,j}^i \in E_c, j = 1, \ldots, k\}$ for each $e_{cg}^i \in E_{cg}$; |
| 5 | Transfer $E_c^i$ back to the semantic product repr. space, which is calculated as $E_s^i = W_c^{*-1} E_c^i$; |
| 6 | Find k nearest neighbors $E_s^i = \{e_{s,j}^i \in E_s, j = 1, \ldots, k\}$ for each $e_s^i \in E_s^i$; |
| 7 | Return the products corresponding to $E_s^i$; |

Steps 4 and 6 in Algorithm 2 can also be formulated as a classification procedure. For example, with the learnt $W^*_c$, both steps can be denoted as follows:

$$W_1^*, B_1^* = \arg\min \text{Softmax}(E_{cg}, W_1 + B_1) - Y_c \quad \text{(Eq. 7)}$$

$$W_2^*, B_2^* = \arg\min \text{Softmax}(E_s, W_2 + B_2) - Y_s \quad \text{(Eq. 8)}$$

$$Y_c = \{y_c^i | y_c^i \in \mathbb{R}^{|E_{cg}| \times |E_c|}\} \quad \text{(Eq. 9)}$$

$$Y_s = \{y_s^i | y_s^i \in \mathbb{R}^{|E_s| \times |E_s|}\} \quad \text{(Eq. 10)}$$

Where $y_c^i = 1$ is $e_{cg}^i$ represents the product I in the space $E_{cg}$; otherwise, $y_c^i = 0$. Similarly, $y_s^i = 1$ if $e_s^i$, represents the product I in the space $E_s$; otherwise $y_s^i = 0$.

According to some embodiments, apart from co-view similarity-based product representation, other kinds of product representation that are trained under concepts different from considering semantic meanings can also be transferred by Algorithm 2, such as product representation trained in the consideration of image similarity.

Turning to another embodiment, Step 410 performs 2) extended feature space transfer. In the discussion above, 1) direct embedding space transfer of Step 410 involves a trained mapping between two disparate product representations. In 2) extended feature space transfer modelling for Step 410, information related to CTR and CVN (as opposed to a title-semantic-based product representations) can be utilized. Since heterogeneous features are considered together, a Gradient Boost Decision Tree (GBDT) is used to ensemble the CTR and CVN data without performing additional normalization steps. Step 410 modeling in 2) extended feature space transfer can be presented as follows:

$$CTR=GBDT(E_1|E_2|\ldots|E_K) \quad \text{(Eq. 11)}.$$

Where $E_1, \ldots, E_k$ are features generated in different spaces. In some embodiments, in order to align these features into a shared multi-lingual space, the above trained GBDT model can be directly applied to products in another country/language. The features can include, but are not limited to, title and description (product representations data discussed above in Steps 406-408); categorical data (since two markets share the same category tree, this data can be implemented by, for example, encoding the data as input into the GBDT); and numerical data (some shared features that are represented as floating numbers).

As a result of Step 410, utilizing either model 1) or 2), list of recommended items is produced and a ranking operation is performed. Step 412. The results set output from Step 410 includes a set of items that correspond to the request from Step 402. This results set includes a ranked listing of items that are ordered based on the factors identified in item 512, as illustrated in FIG. 5. This evidences the manner in which the source language can influence the way a ranking of items is output in a target language. That is, for example, how popular or similar to other items in the TW market an item is has an impact on how an item will be recommended in another country (e.g., the US).

In Step 414 (and item 516 of FIG. 5), this is output to the user. In some embodiments, the ranked set from Step 412 can be formulated into a search query for additional items and fed to a search engine. This then provides the recommended items, which is the result of the search. In some embodiments, the ranked set from step 412 can be sent as a message or updated within a portion of an interface the user is viewing, which indicates items that are recommended to the user.

FIG. 6 is a work flow process 600 for serving related digital media content based on the information associated with a recommendation (from Step 414 of FIG. 4 and item 516 of FIG. 5) above). In some embodiments, the content can be associated with or comprising advertisements (e.g., digital advertisement content). Such information can be referred to as "recommendation information" for reference purposes only.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 602, recommendation information is identified. This information can be derived from or provided as a result from Step 414 above. For purposes of this disclosure, Process 600 will refer to single output recommendation; however, it should not be construed as limiting, as any number of recommendations, over any amount of time for any number of users, can form such basis, without departing from the scope of the instant disclosure.

In Step 604, a context is determined based on the identified recommendation information. This context forms a basis for serving content related to the recommendation information. For example, a recommendation was provided for a user to purchase a blender; therefore, the context can be for "kitchen appliances"; and, can be leveraged in order to identify digital content related to additional deals for the user at appliance stores and/or online.

In some embodiments, the identification of the context from Step 604 can occur before, during and/or after the analysis detailed above with respect to Process 400, or it can be a separate process altogether, or some combination thereof.

In Step 606, the determined context is communicated (or shared) with a content providing platform comprising a server and database (e.g., content server 106 and content database 107, and/or advertisement server 130 and ad database). Upon receipt of the context, the server performs (e.g., is caused to perform as per instructions received from the device executing the engine 300) a search for a relevant digital content within the associated database. The search for the content is based at least on the identified context.

In Step 608, the server searches the database for a digital content item(s) that matches the identified context. In Step 610, a content item is selected (or retrieved) based on the results of Step 608. In some embodiments, the selected content item can be modified to conform to attributes or capabilities of the message, or page, interface, platform, application or method upon which the recommendation will be displayed, and/or to the application and/or device for which it will be displayed. In some embodiments, the selected content item is shared or communicated via the application the user is utilizing to view, render and/or interact with a message, text, media, content or object item. Step 612. In some embodiments, the selected content item is sent directly to a user computing device for display on the device and/or within the UI displayed on the device's display (e.g., inbox, or as a message within the inbox). In some embodiments, the selected content item is displayed within a portion of the interface or within an overlaying or pop-up interface associated with a rendering interface displayed on the device. In some embodiments, the selected content item can be displayed as part of a coupon/ad clipping, coupon/ad recommendation and/or coupon/ad summarization interface.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising the steps of:

identifying, by a computing device, a request associated with a user;

parsing, via the computing device, said request, and based on said parsing, identifying information indicating words in said request and language information indicating a source language and a target language;

generating, via the computing device, multi-lingual word embeddings corresponding to a set of m words in both the source language and the target language based on the word information and the language information, the multi-lingual word embeddings comprising a first set of m word embeddings corresponding to the source language and a second set of m word embeddings corresponding to the target language, wherein m is a variable representing a numeric value;

identifying, via the computing device, product information for a set of products based on the request and the language information, the product information being at least in the source and target language;

generating, via the computing device, a multi-lingual product representation based on the product information and the multi-lingual word embeddings;

determining, via the computing device, a ranked set of results based on the request, said determination comprising applying a knowledge base corresponding to the source language to the multi-lingual product representation, and generating the ranked set of results; and communicating, via the computing device, to the user, said ranked set of results.

2. The method of claim 1, further comprising:

identifying a total number of words associated with said request, said total number of words being based on the source language and the target language, wherein said generated multi-lingual word embeddings are based on said total number of words.

3. The method of claim 1, further comprising:

generating a word dictionary based on said word information and said language information, said generation comprising mapping each word in the source language to each word in the target language and providing a matrix of how each word relates to its counterpart, wherein said generated multi-lingual word embeddings are based on the word dictionary.

4. The method of claim 1, further comprising:

analyzing the product information using natural language processing (NLP), and determining a segmentation of the product information;

eliminating differences in grammar between the languages using a computer vision algorithm; and determining a semantic representation of the product information based on said segmentation analysis, wherein said product information is based on said semantic representation.

5. The method of claim 1, further comprising:

generating a search query based on said ranked set of results;

searching for recommendation data based on said search query; and providing results of the search to the user as a recommendation.

6. The method of claim 1, wherein said source language defined knowledge base comprises a direct embedding space transfer based at least on co-view data and image similarity analysis data.

7. The method of claim 1, wherein said source language defined knowledge base comprises an extended feature space transfer based at least on prediction of conversion rate (CVN) data and prediction of click-through-rate (CTR) data.

8. The method of claim 1, wherein said request is generated by the computing device, said request generation comprising identifying an activity of the user, and based on said identifying, generating said request, said generated request comprising information corresponding to said activity.

9. The method of claim 1, wherein said request is based on input provided by the user, said input corresponding to a webpage provided by the computing device.

10. The method of claim 1, further comprising:

searching, over a network, a datastore associated with a third party entity based on information associated with said ranked set of results;

identifying, based on said search, third party digital content from said datastore; and communicating, over the network, along with said ranked set of results, said identified third party digital content.

11. A non-transitory computer-readable storage medium tangibly encoded with computer-executable instructions, that when executed by a processor associated with a computing device, performs a method comprising the steps of:
   identifying, by the computing device, a request associated with a user;
   parsing, via the computing device, said request, and based on said parsing, identifying information indicating words in said request and language information indicating a source language and a target language;
   generating, via the computing device, multi-lingual word embeddings corresponding to a set of m words in both the source language and the target language based on the word information and the language information, the multi-lingual word embeddings comprising a first set of m word embeddings corresponding to the source language and a second set of m word embeddings corresponding to the target language, wherein m is a variable representing a numeric value;
   identifying, via the computing device, product information for a set of products based on the request and the language information, the product information being at least in the source and target language;
   generating, via the computing device, a multi-lingual product representation based on the product information and the multi-lingual word embeddings;
   determining, via the computing device, a ranked set of results based on the request, said determination comprising applying a knowledge base corresponding to the source language to the multi-lingual product representation, and generating the ranked set of results; and
   communicating, via the computing device, to the user, said ranked set of results.

12. The non-transitory computer-readable storage medium of claim 11, further comprising:
   identifying a total number of words associated with said request, said total number of words being based on the source language and the target language, wherein said generated multi-lingual word embeddings are based on said total number of words.

13. The non-transitory computer-readable storage medium of claim 11, further comprising:
   generating a word dictionary based on said word information and said language information, said generation comprising mapping each word in the source language to each word in the target language and providing a matrix of how each word relates to its counterpart, wherein said generated multi-lingual word embeddings are based on the word dictionary.

14. The non-transitory computer-readable storage medium of claim 11, further comprising:
   analyzing the product information using natural language processing (NLP), and determining a segmentation of the product information;
   eliminating differences in grammar between the languages using a computer vision algorithm; and
   determining a semantic representation of the product information based on said segmentation analysis, wherein said product information is based on said semantic representation.

15. The non-transitory computer-readable storage medium of claim 11, further comprising:
   generating a search query based on said ranked set of results;
   searching for recommendation data based on said search query; and
   providing results of the search to the user as a recommendation.

16. The non-transitory computer-readable storage medium of claim 11, wherein said source language defined knowledge base comprises a direct embedding space transfer based at least on co-view data and image similarity analysis data.

17. The non-transitory computer-readable storage medium of claim 11, wherein said source language defined knowledge base comprises an extended feature space transfer based at least on prediction of conversion rate (CVN) data and prediction of click-through-rate (CTR) data.

18. A computing device comprising:
   a processor; and
   a non-transitory computer-readable storage medium for tangibly storing thereon program logic for execution by the processor, the program logic comprising:
      logic executed by the processor for identifying a request associated with a user;
      logic executed by the processor for parsing said request, and based on said parsing, identifying information indicating words in said request and language information indicating a source language and a target language;
      logic executed by the processor for generating multi-lingual word embeddings corresponding to a set of m words in both the source language and the target language based on the word information and the language information, the multi-lingual word embeddings comprising a first set of m word embeddings corresponding to the source language and a second set of m word embeddings corresponding to the target language, wherein m is a variable representing a numeric value;
      logic executed by the processor for identifying product information for a set of products based on the request and the language information, the product information being at least in the source and target language;
      logic executed by the processor for generating a multi-lingual product representation based on the product information and the multi-lingual word embeddings;
      logic executed by the processor for determining a ranked set of results based on the request, said determination comprising applying a knowledge base corresponding to the source language to the multi-lingual product representation, and generating the ranked set of results; and
      logic executed by the processor for communicating to the user, said ranked set of results.

19. The computing device of claim 18, further comprising:
   logic executed by the processor for identifying a total number of words associated with said request, said total number of words being based on the source language and the target language; and
   logic executed by the processor for generating a word dictionary based on said word information and said language information, said generation comprising mapping each word in the source language to each word in the target language and providing a matrix of how each word relates to its counterpart,
   wherein said generated multi-lingual word embeddings are based on said total number of words and the word dictionary.

20. The computing device of claim 18, further comprising:
- analyzing the product information using natural language processing (NLP), and determining a segmentation of the product information;
- eliminating differences in grammar between the languages using a computer vision algorithm; and
- determining a semantic representation of the product information based on said segmentation analysis, wherein said product information is based on said semantic representation.

\* \* \* \* \*